United States Patent [19]
Lousberg

[11] Patent Number: 5,979,863
[45] Date of Patent: Nov. 9, 1999

[54] IRRIGATION CONTROL VALVE AND SCREEN

[75] Inventor: Bradley M. Lousberg, Oceanside, Calif.

[73] Assignee: Hunter Industries, Inc., San Marcos, Calif.

[21] Appl. No.: 08/752,444

[22] Filed: Nov. 14, 1996

[51] Int. Cl.[6] ........................ F16K 31/122; F16K 31/42
[52] U.S. Cl. .................. 251/30.02; 137/549; 251/30.05; 251/46
[58] Field of Search ..................... 137/549, 550; 251/30.02, 30.05, 45, 46; 210/390, 392, 448, 453, 454

[56] References Cited

U.S. PATENT DOCUMENTS

| | | | |
|---|---|---|---|
| 3,195,730 | 7/1965 | Muller | 210/488 |
| 4,081,171 | 3/1978 | Morgan et al. | 251/30.02 |
| 4,107,043 | 8/1978 | McKinney | 210/232 |
| 4,135,696 | 1/1979 | Saarem et al. | 251/30.02 |
| 4,180,236 | 12/1979 | Saarem et al. | 251/46 |
| 4,360,037 | 11/1982 | Kendall | 251/30.05 |
| 4,508,136 | 4/1985 | Kah, Jr. | 251/46 |
| 4,740,302 | 4/1988 | Rosenberg | 210/392 |
| 4,751,000 | 6/1988 | Drori | 210/448 |
| 4,893,645 | 1/1990 | Augustinas et al. | 251/46 |
| 4,966,702 | 10/1990 | Drori | 210/448 |
| 5,100,550 | 3/1992 | Brulhart | 210/322 |
| 5,133,382 | 7/1992 | Nielsen | 251/30.02 |
| 5,213,124 | 5/1993 | Costa | 251/30.02 |

*Primary Examiner*—George L. Walton
*Attorney, Agent, or Firm*—Michael H. Jester

[57] ABSTRACT

A control valve comprises a housing having an inlet for connecting to a source of water and an outlet, a pressure responsive diaphragm valve assembly including a valve disc having a front face and a back face mounted in the passage for engagement with the valve seat, and a pilot passage between the front face and the back face, a friction plate on the back face, and a screen plate on the front face of the valve member, the screen plate having a cup shape and screen openings at a corner edge of the disc communicating with the pilot passage from the front face of the valve to a back of the diaphragm for controlling the rate of opening of the valve for controlling flow of fluid through the valve to the sprinkler unit.

20 Claims, 2 Drawing Sheets

IRRIGATION CONTROL VALVE AND SCREEN

BACKGROUND OF THE INVENTION

The present invention relates to irrigation systems and pertains particularly to an improved irrigation control diaphragm valve and screen.

The artificial distribution of water through irrigation systems is in wide use throughout the world today. One of the most widely used systems, particularly for lawn areas and playing or athletic fields, is the sprinkler system wherein a plurality of sprinkler units are positioned about a land area for distributing water over the surface of the land area. One or more control valves control the distribution of water to the sprinkler units within the system.

Commercial, industrial, municipal and golf course irrigation systems increasingly rely on alternative water sources including reclaimed water as an irrigation water source. This trend has been prompted by an often critical need to conserve water in most regions of the country. Other alternative water sources include lakes, reservoirs, wells, and the like. However, since water from these sources is often relatively dirty, its use has brought with it an increase in the incidence of clogging of various components of irrigation systems. While the obvious solution is simply to filter the water entering the irrigation system, the cost of such filters, and their maintenance, limits the degree of filtering that is economically feasible.

The problem of clogging in irrigation systems is most acute in areas in the system where water must pass through small openings. Such systems having small openings occur, for example, in irrigation systems having pressure responsive control valves, pressure regulating valves, in drip systems, and in other low flow irrigation configurations.

For example, in irrigation systems having pressure responsive and pressure regulating valves, have a main diaphragm valve that is normally pilot operated with upstream or inlet water pressure which passes via a small passage to the back of the main diaphragm valve to apply valve closing pressure. In pressure regulating valves the down stream water pressure, which is directed to the sprinklers, is regulated by a feedback mechanism. The main diaphragm valve normally pilot operated with upstream or inlet water pressure fed via a small passage to the back of the diaphragm to maintain it closed. The passage is normally from the face or front of the valve to the back thereof. A grit screen is placed at the inlet of the passage to screen out small particles that may clog the passage.

One widely used prior art screen is illustrated in FIGS. 1 and 2 and comprises a retaining washer on the end of the diaphragm shaft having ribs which standoff against a stainless steel washer on the face of the valve. Water passes through grooves formed between the ribs and washer to a restricted spiral passage in a friction plate to a control chamber behind the valve. This construction is complicated and expensive to make because of the many parts required.

Referring to FIG. 1, there is illustrated an exemplary prior art pressure regulating valve of a type commonly used in irrigation systems. This pressure regulating valve is a diaphragm-type valve which includes an inlet port 12 for receiving irrigation water and an outlet port 14 for conveying water to one or more sprinkler stations. The pressure regulating valve 10 controls the flow of water from the inlet port 12 to the outlet port 14 by means of a diaphragm valve assembly 16 which is raised or lowered from a valve seat 18 to turn the valve on and off. As illustrated in FIG. 1, the valve is in the OFF position, since a diaphragm seal 20 is in contact with the valve seat 18.

The diaphragm assembly 16 includes a diaphragm 44 in the form of an annular resilient member which permits reciprocal up and down motion of the diaphragm assembly 16. The pressure regulating valve 10 also includes a solenoid 24 which is operable by means of an electrical signal to actuate a solenoid valve 26 to move between raised and lowered positions. Above diaphragm 22, there is a diaphragm pressure chamber 28 into which water from the inlet port 12 flows through a metered pathway to be described. A diaphragm chamber outlet pathway 30 permits water to flow from the diaphragm chamber past the solenoid piston 26 and, when the solenoid is in the upward, or open, position, to a crossover pathway 32. Crossover pathway 32 is also connected to an outlet pathway 34 which permits water to flow to the outlet port 14.

In operation, when the solenoid piston 26 is in the down position, no water is allowed to flow out of the diaphragm chamber 28 through the diaphragm outlet pathway 30. As a result, pressure in the diaphragm chamber 28 builds up to equal the pressure in the inlet port 12. However, the area above the diaphragm, which is affected by the pressure in the diaphragm chamber, is greater than the area below the diaphragm seal 20, which is affected by the pressure in the inlet port. As a consequence, there is a resultant downward force on the diaphragm valve assembly 16 which causes it to close the diaphragm seal 20 on the valve seat 18. The valve 10 is then in the OFF position and no water can flow from the inlet port 12 to the outlet port 14.

When the solenoid 24 is energized by a signal from an irrigation controller (not shown) carried on an electrical wire 36, the solenoid operated valve 26 moves up. This permits water to flow out of the diaphragm chamber 28 and then to the outlet port 14 by way of the diaphragm outlet pathway 30, crossover pathway 32 and outlet pathway 34. As a result, pressure in the diaphragm chamber 28 will decrease enough so that the pressure at the inlet port 12 is higher by an amount sufficient to raise the diaphragm valve assembly off the valve seat 18. This allows water to flow from the inlet port past valve seat 18 and directly into the outlet port 14.

The diaphragm valve assembly 16, as seen in FIG. 1, comprises an annular diaphragm 44 having a peripheral rim 46 which is secured in post-annular grooves between the upper and lower housings of the valve assembly. The diaphragm has an inner peripheral rim 48 which is clamped between a friction plate 50 having upstanding walls which are engaged by a retaining insert 52 for clamping the inner peripheral rim 48 of the diaphragm. A diaphragm seal member 20 is clamped in a recess in the friction plate 50 by means of a retaining plate or screen 56. The retaining plate or screen 56 is held in position by a diaphragm shaft 58 which extends upward into a bore in an adjusting assembly in the center of the valve body. A retaining washer 60 on the inside phase of the friction plate 50 retains the shaft 58 in place. The retaining plate or screen 56 is formed with radially extending ribs or grooves that form radially extending water passages between the ribs or within the grooves as it engages against a stainless steel washer 62, engaging the front or upstream face of the diaphragm seal member 20.

Water for pressurized operation of the diaphragm valve is metered or screened through the passages formed by the grooves at the engagement of the screen 56 and stainless steel washer 62 and passes into an annular radially spiraling groove 64 in the phase of friction plate 50 forming a restricted passage way which exits at 66 into the diaphragm chamber 28 behind the diaphragm 44. The pressure exerted by the water in diaphragm 28 controls the pressurized sealing of the diaphragm seal 20. As shown in FIG. 1, a screen and retaining washer have a throughbore for receiving a diaphragm shaft, a stainless steel washer, a valve seal, a friction plate, a retainer washer and a retainer insert to secure the assembly to an annular diaphragm.

Accordingly, there is a need for simpler more effective and inexpensive diaphragm valve with a simpler more effective screen.

SUMMARY AND OBJECTS OF THE INVENTION

Accordingly, it is a primary object of the present invention to provide a sprinkler control diaphragm valve having an improved screen assembly for pilot control water.

Another object of the present invention to provide a sprinkler control valve having a simple and inexpensive construction including screen assembly for pilot control water.

In accordance with the primary aspect of the present invention, a sprinkler control valve comprises a pressure responsive diaphragm valve assembly including a valve disc having a front face and a back face mounted for engagement with a valve seat, and a pilot passage between said front face and said back face, a friction plate on said back face, and a screen plate on said front face of said valve member, said screen plate having a cup shape and screen openings at a corner edge of said disc communicating with said pilot passage from said front face of said valve to a back of said diaphragm.

BRIEF DESCRIPTION OF THE DRAWINGS

The above and other objects and advantages of the present invention will become apparent from the following description when read in conjunction with the drawings wherein.

DETAILED DESCRIPTION OF A PREFERRED EMBODIMENT

The present invention provides an improved irrigation control valve with an improved screen for cleaning debris from pilot control water for irrigation system valves. The invention provides a simple four part valve and screen assembly that replaces the seven part assembly of the prior art.

While the problem of clogged passages in irrigation systems is most prominent in irrigation systems employing pressure regulating valves, it will be appreciated that the techniques of the present invention may be advantageously used with other kinds of valves which experience clogging problems such as low flow systems, drip systems and others.

Figure 1:
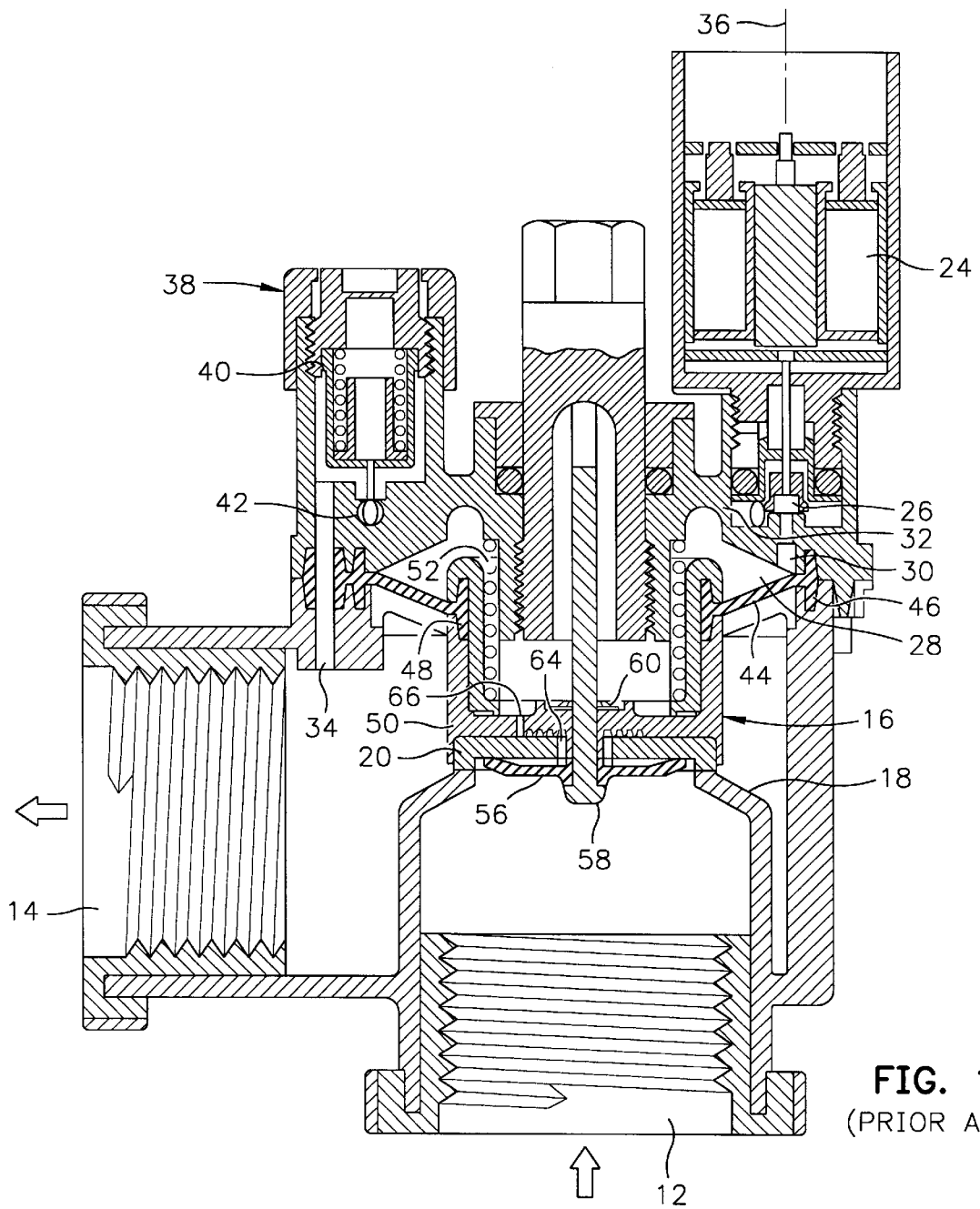
FIG. 1 is a side elevation section view of an exemplary prior art valve construction.
Figure 2:
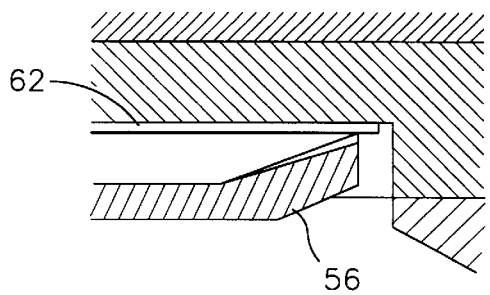
FIG. 2 is an enlarged partial side elevation section view of the valve of FIG. 1 showing details of the screen.
Figure 3:
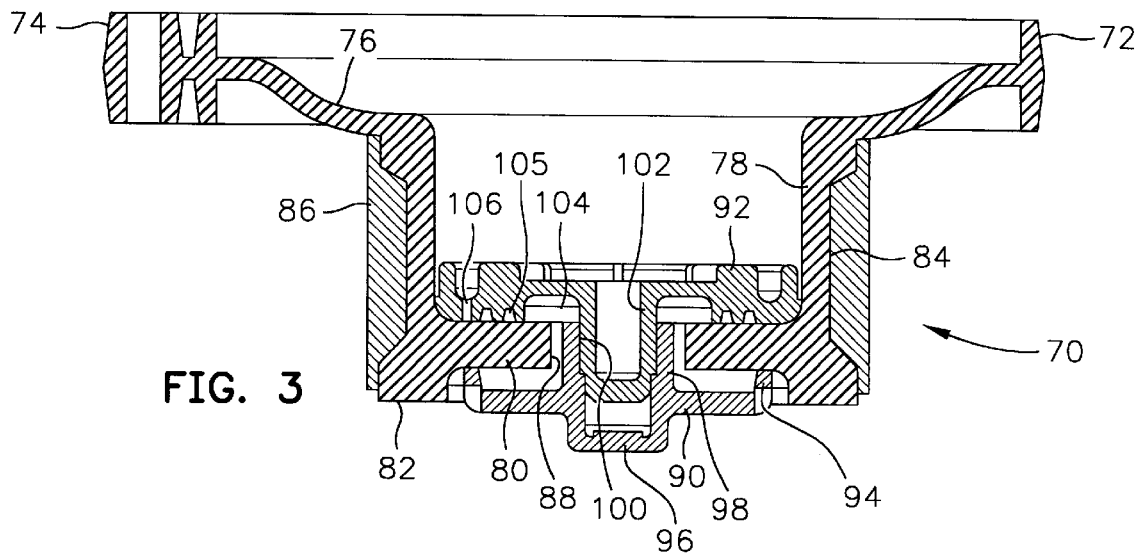
FIG. 3 is a side elevation section view in section of an exemplary valve in accordance with the present invention.
Figure 4:
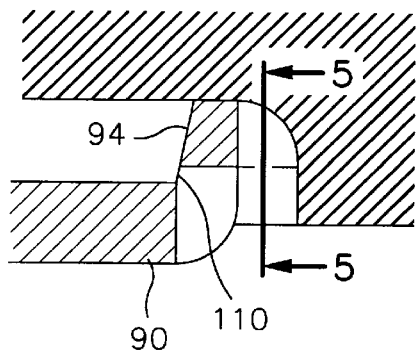
FIG. 4 is a side elevation section view like FIG. 2 showing details of the valve screen in accordance with the present invention.

Referring now to FIG. 3 of the drawing, a diaphragm valve assembly in accordance with the present invention is illustrated and designated generally by the numeral 70 and comprises a unitary elastic diaphragm member having a peripheral sealing rim 72 for sealingly fitting within an annular groove between upper and lower halves in the main valve housing and further including a circular seal 74 for sealing the passageway 34 between the two housing members. The diaphragm has an upper outer circular annular membrane portion 76 that extends inward from the peripheral rim 72 to an upper end of a generally cylindrical tubular central body portion 78 which extends axially downward to a circular valve disc 80 having an annular valve seal 82 for sealingly engaging the valve seat 18 of the valve housing. The annular valve seal 82 is defined by an annular peripheral planar face surrounding an annular central recess in the face of the diaphragm seal member.

The central body portion 78 has a cylindrical or circular tubular configuration and includes an annular recess 84 in the outside of the annular wall which receives an inwardly projecting portion of an annular support ring or band 86 which extends inwardly to engage and support and cylindrical wall 78 of the central valve assembly or member. The retaining or support band 86 is seated in the annular recess 84 and serves to support the wall 78 against collapsing from extensive use.

The valve disc 80 is formed with a central through bore 88 through which water communicates from the front face or inlet side of the diaphragm valve to the backside. It also provides for or enables connection between a screen plate 90 on the inlet side of the valve and a friction plate 92 on the backside of the diaphragm valve.

The screen plate 90 is formed with an annular or circular disc portion with an outer or peripheral axially extending cylindrical wall 94 which provides a dish-like construction of the screen member and provides a stand-off against the front face of the valve disc 80. The screen disc is formed with a central hub 96 having axially extending peripheral cylindrical walls 98 forming a bore 100 and extending through bore 88 of the valve disc 80. The friction plate 92 has a generally circular disc-like construction with a central projecting stud 102 which extends through the bore 88 in the valve disc 80 into the bore 100 in the screen plate 90 and is secured in place by any suitable means, such as bonding, gluing, sonic welding, or the like.

The friction plate 92 is formed with an inlet annulus 104 near the central axis thereof which communicates with passages defined by bore 88 in valve disc 80 and with a spiral groove forming a spiral passage 105 which extends to and communicates at an outlet port 106 with the pressure chamber 28 behind the diaphragm valve. The elongated passageway imposes friction or resistance to the flow of water and controls the rate of flow of water to the pressure chamber in back of the diaphragm.

Figure 5:
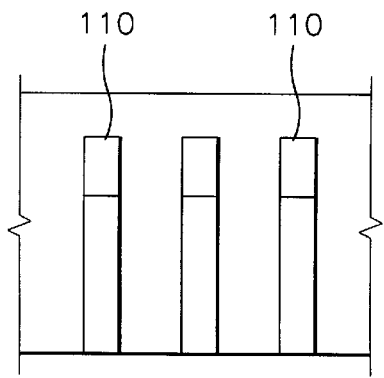
FIG. 5 is a view on line 5—5 of FIG. 4 showing details of the valve screen openings in accordance with the present invention.

Referring to FIG. 5, openings 110 for the passage of water and screening of grit and fine particles from water are formed at the juncture of the disc plate 90 and the cylindrical peripheral wall 94. These openings as seen in FIG. 5 have a preferably rectangular configuration with a height of about twice the width and are preferably on the order of about 0.007×0.015 inches. This size in configuration will stop small grains of said, yet leave part of the opening open to enable water flow around the grain of sand to pass through. Water passes through this opening and along a passage way formed beneath the screen disc 90 and along the bore 88 to the inlet 104 to the friction plate. The water then passes along the spiral passage way to outlet 106 into the chamber 28 behind or above the diaphragm and biases the valve to a closed position as long as pilot valve 26 is closed.

The valve is opened by actuation of solenoid 24 which lifts the valve 26 from its seat opening passage 30 for venting the chamber 28 to the cross-over passage way 32 and to the passage 34 to the outlet end of the valve. Thus, relieving the pressure in chamber 28 which permits the inlet pressure through inlet 12 to push the valve 70 open and allow water to pass through the valve body to the outlet 14.

While I have illustrated and described my invention by means of specific embodiments, it should be understood that numerous changes and modifications may be made therein without departing from the spirit and scope of the invention as defined in the appended claims:

I claim:

1. A sprinkler control valve, comprising:

a housing having an inlet for connecting to a source of water, an outlet for connection to a distribution line for distributing water to a sprinkler unit, a passage connecting said inlet to said outlet;

a valve seat in said passage;

a pressure responsive diaphragm valve formed with a valve disc having a front face and a back face mounted in said passage for engagement with said valve seat, and a pilot passage between said front face and said back face;

a friction plate on said back face; and a screen plate on said front face of said valve member, said screen plate having a generally cup shape with a circular disc and a circular peripheral wall extending outward from said disc and screen openings through said plate at a corner edge of said plate at the juncture of said disc and said wall and communicating with said pilot passage from said front face of said valve to a back of said diaphragm.

2. A control valve according to claim 1 wherein said diaphragm valve disc has a bore through the center thereof and said friction plate and said screen plate are connected together through said bore.

3. A control valve according to claim 2 wherein:

said friction plate has a first cylindrical bore; and said friction plate has an elongated stud extending through said bore into said first cylindrical bore.

4. A control valve according to claim 1 wherein:

said friction plate has a first cylindrical bore; and said friction plate has an elongated stud extending through said bore into said first cylindrical bore.

5. A control valve according to claim 4 wherein:

said diaphragm valve assembly comprises an outer peripheral membrane with a central cylindrical body extending from said membrane at one end to said valve disc at the other end.

6. A control valve according to claim 5 wherein said cylindrical body is encircled by a support band.

7. A control valve according to claim 1 wherein:

said diaphragm valve assembly comprises an outer peripheral membrane with a central cylindrical body extending from said membrane at one end to said valve disc at the other end.

8. A control valve according to claim 7 wherein said cylindrical body is encircled by a support band.

9. A control valve according to claim 8 wherein said diaphragm valve disc has a bore through the center thereof and said friction plate and said screen plate are connected together through said bore.

10. A control valve according to claim 8 wherein:

said friction plate has a first cylindrical bore; and said friction plate has an elongated stud extending through said bore into said first cylindrical bore.

11. A control valve according to claim 8 wherein said cylindrical body has an annular recess around an outer surface thereof; and said support band is seated in said annular recess.

12. A pilot operated irrigation control valve, comprising:

a housing having an inlet for connecting to a source of water, and an outlet for distributing water out from said housing, a passage connecting said inlet to said outlet;

a valve seat in said passage between said inlet and said outlet;

a pressure responsive diaphragm valve assembly comprising a generally circular diaphragm having a valve disc formed therein proximate the center thereof, said valve disc having a front face and a back face, said diaphragm mounted in said passage for engagement of said front face with said valve seat, and a pilot passage between said front face and said back face;

a friction plate on said back face; and a screen plate on said front face of said valve member, said screen plate having a cup shape with a bottom and peripheral wall and screen openings through said plate at a corner edge defined by a juncture of said bottom and peripheral wall and communicating with said pilot passage from said front face of said valve to a back of said diaphragm.

13. A control valve according to claim 12 wherein said diaphragm valve disc has a bore through the center thereof and said friction plate and said screen plate directly engage said valve disc and are connected together through said bore.

14. A control valve according to claim 13 wherein said diaphragm valve assembly comprises an outer peripheral membrane with a central cylindrical body extending from said membrane at one end to said valve disc at the other end.

15. A control valve according to claim 14 wherein:

said cylindrical body is formed with an annular recess around an outer surface thereof; and a circular support band is seated in said annular recess.

16. A control valve according to claim 12 wherein said diaphragm valve disc has a recess formed in the center of the front face thereof and said screen plate is seated in said valve disc recess.

17. A diaphragm control valve assembly, comprising:

a unitary generally circular diaphragm having an annular flexible membrane and a valve disc formed proximate the center thereof, said valve disc having a front face and a back face, said diaphragm adapted to be mounted in a housing for engagement of said front face with a valve seat, and a pilot passage between said front face and said back face;

a friction plate directly engaging said back face having an elongated passage communicating with said pilot passage; and a screen plate on said front face of said valve member, said screen plate having a cup shape defined by a generally circular disc and outer peripheral cylindrical walls, and having screen openings through said plate at a corner edge formed at the juncture of said circular disc and outer peripheral cylindrical walls, said screen openings communicating with said pilot passage from said front face of said valve to a back of said diaphragm.

18. A control valve according to claim 17 wherein said diaphragm valve disc has a bore through the center thereof and said friction plate and said screen plate directly engage said valve disc and are connected together through said bore.

19. A control valve according to claim 18 wherein said diaphragm valve assembly comprises an outer peripheral membrane with a central cylindrical body extending from said membrane at one end to said valve disc at the other end.

20. A control valve according to claim 17 wherein said diaphragm valve disc has a recess formed at the center of the front face thereof and said screen plate is seated in said valve disc recess.

* * * * *